Nov. 27, 1945.　　　A. H. WINKLER ET AL　　　2,390,019
CARBURETOR
Filed March 20, 1941　　　3 Sheets-Sheet 1

INVENTORS
ALBERT H. WINKLER
JOHN H. GORE
BY
ATTORNEY

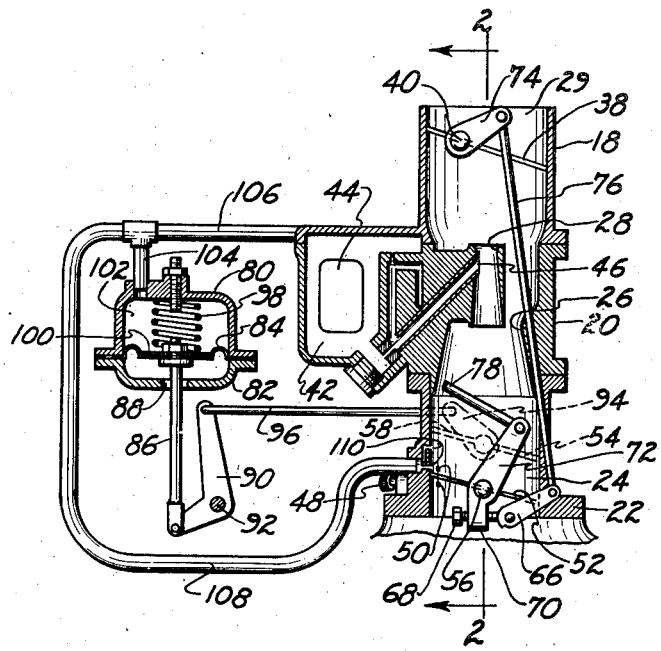
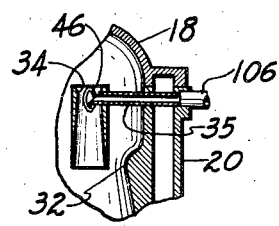
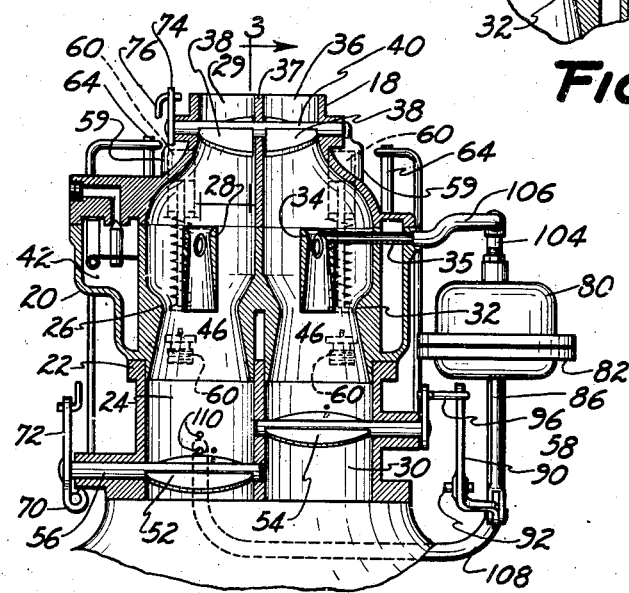

Nov. 27, 1945.  A. H. WINKLER ET AL  2,390,019
CARBURETOR
Filed March 20, 1941  3 Sheets-Sheet 3

INVENTORS
ALBERT H. WINKLER
JOHN H. GORE
BY
ATTORNEY

Patented Nov. 27, 1945

2,390,019

UNITED STATES PATENT OFFICE 2,390,019

CARBURETOR

Albert H. Winkler and John H. Gore, South Bend, Ind., assignors to Bendix Aviation Corporation, South Bend, Ind., a corporation of Delaware Application March 20, 1941, Serial No. 384,274

20 Claims. (Cl. 261—23)

This invention relates generally to charge forming devices and more particularly to means for controlling the throttle valves in multiple stage carburetor systems for internal combustion engines.

Multiple stage carburetor systems for widely variable speed internal combustion engines such as are commonly used in automotive vehicles and the like may comprise either a plurality of independent carburetors or an integral carburetor having a plurality of induction passages. In either arrangement there are a plurality of induction passages connected with a common intake manifold or complementary manifolds, throttle valves for the respective passages, and means for controlling the valves whereby said valves are opened progressively.

The general purpose of this type of carburetor system is to supply the engine with an economical fuel mixture from a primary source, which may comprise one primary induction passage or a plurality of said passages, throughout the lower speed range which, in an automobile engine, is used to the greatest extent; to supply the engine with a supplementary mixture from one or more supplementary or auxiliary induction passages at speeds above said lower speed range, thereby increasing the volume of the mixture delivered to permit the engine to develop its maximum speed and power; and to close off the supplemental passage or passages when the engine is operating under low speed wide open throttle conditions thereby furnishing the engine with a mixture of combustible proportions under such conditions and permitting very low speed operation without missing or stalling.

The throttle valve for the primary induction passage or first stage is manually controlled, being customarily connected with the normal accelerator pedal. Various means have been employed to control the remaining throttle valve or valves but such means have not proved entirely satisfactory in controlling a carburetor system of the multiple stage type so as to accurately meet the fuel mixture requirements of the engine under all operating conditions.

It is, therefore, an important object of the present invention to provide an improved control means for the throttle valves of the multiple stage type of carburetor system whereby the various fuel mixture requirements of the engine will be met.

Another object of the invention is to provide, in a control mechanism of this character, suction responsive means for controlling the throttle valve of a supplemental or auxiliary induction passage, said means being responsive to the resultant of the fluid pressures in proximate induction passages relative to their order of operation.

Still another object of the invention is to provide mechanism of this character wherein at least one of the connections of said suction responsive means is with a venturi in said supplemental passage.

A further object of the invention is to provide a device of this character wherein means is provided for controlling one of the conduits connecting the suction responsive device and the respective adjacent induction passages relative to their sequence of operation.

A still further object of the invention is the provision in a device of this character of a suction connection for said suction responsive device communicating with a preceding induction passage adjacent the throttle valve thereof and controlled thereby.

The invention is further characterized by the progressive and smooth opening of the throttle valves of the respective induction passages, the smooth blending of the mixtures delivered thereby as the secondary throttle valve is opened, the slow initial opening of the suction controlled throttle valve or valves, and by the simplicity of construction and operation of the device.

The characteristics and advantages of the invention are further sufficiently referred to in connection with the following detailed description of the accompanying drawings, which represent certain preferred embodiments. After considering these examples, skilled persons will understand that many variations may be made without departing from the principles disclosed, and it is contemplated that any structures, arrangements or modes of operation may be employed that are properly within the scope of the appended claims.

Figure 2 is an enlarged vertical section through an integral, multiple barrel carburetor embodying the invention, said view being taken on line 2—2 of Figure 3;

Figure 3 is a vertical section taken on line 3—3 of Figure 2;

Figure 7 is a partial section of the induction passage showing a conduit for the control unit of the secondary induction passage terminating in an impact tube in the small venturi.

Figure 1:
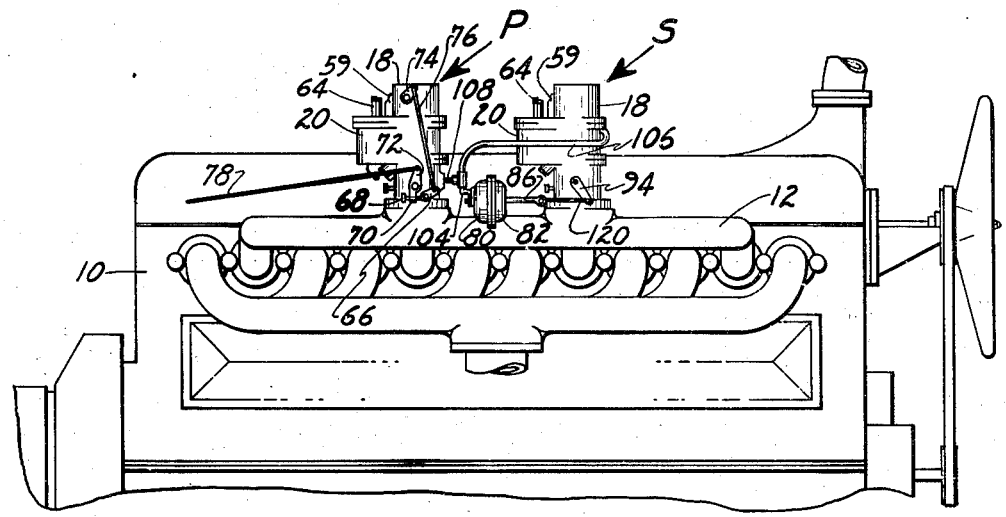
Figure 1 is a fragmentary, side elevational view of an internal combustion engine provided with a fuel induction system embodying the present invention, two separate carburetors being shown.

While the present invention is shown and described as embodied in a multiple stage carburetor system having one primary and one auxiliary or secondary induction passage, it may be embodied in a multiple stage system having a plurality of both primary and secondary induction passages or a single passage for one stage and a plurality of passages for another stage or stages. It may also be embodied in a system of this character wherein the engine has a dual or multiple type of intake manifold, each of said manifolds having corresponding primary and secondary induction passages connected therewith.

Throughout the drawings similar reference characters represent similar parts although where such parts are modified in structure and operation, they are given a further differing reference character.

While the carburetors herein illustrated and described are all of the downdraft type, the present invention may be embodied in any other suitable type such, for example, as an updraft or horizontal delivery type.

Referring first to Figure 1, reference numeral 10 indicates an internal combustion engine having an intake manifold 12 to which are attached carburetors P and S which will be hereinafter more fully described.

Figure 4:
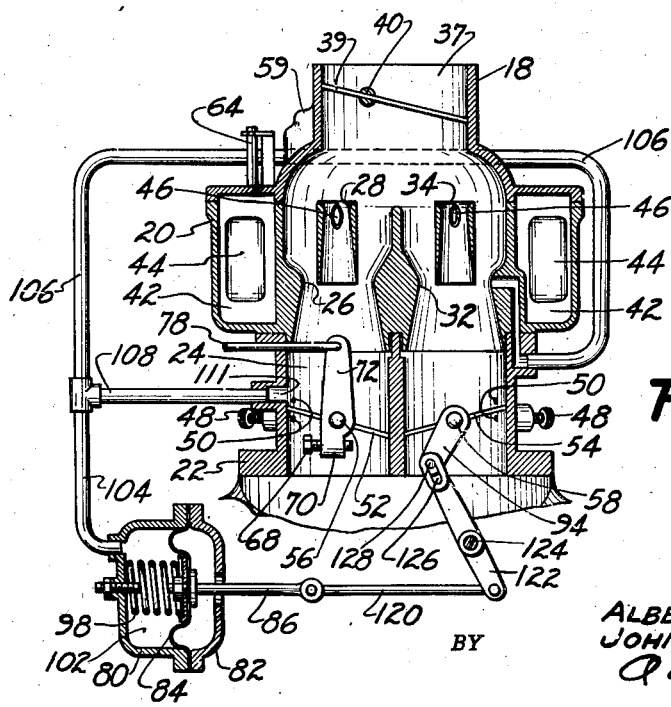
Figure 4 is a vertical sectional view of another modification of the invention.

In Figures 2, 3 and 4, the invention is shown incorporated in the integral multiple barrel type of carburetor but particular reference will first be made to Figures 2 and 3, wherein the carburetor includes an air horn section 18, a body section 20 and a throttle body section 22. The induction passages are termed primary and secondary respectively for convenience. The primary passage includes a throttle barrel or mixing chamber 24, large venturi 26, small venturi 28 and an air inlet 29, and the secondary passage includes a throttle barrel 30, large venturi 32 and small venturi 34, and an air inlet 36, a partition 37 separating the respective induction passages anterior to the large venturis thereof. Each air inlet is controlled by an unbalanced choke valve 38 mounted on a shaft 40 controlled by any well known manual or automatic means. However, it should be understood that if desired the choke valves may be mounted on shafts operable independently of each other. Fuel from any suitable source, not shown, is supplied to a fuel chamber 42, the fuel level of which is controlled in the normal manner by a float 44. Fuel nozzles 46, of known construction and operation, receive fuel from the float chamber and discharge said fuel in the small venturis 28 and 34, respectively, and the usual simple idling system 48 is provided for each induction passage, said idling systems discharging from the jets 50 adjacent throttle valves 52 and 54 mounted on shafts 56 and 58, respectively. The fuel supply system of each induction passage includes an economizer system 59, of known character, having a valve 60 controlled by vacuum responsive means 62. It should be noted that while the means 62 is vacuum responsive, any other suitable means for controlling the valves 60 may be used as, for example, a mechanical linkage actuated with opening movement of the respective throttle valves or with opening movement of one of the throttle valves, preferably the primary throttle valve. An acceleration pump 64 is also provided for both induction passages and said pumps may be of any suitable type operated in the usual way by vacuum or by mechanical linkage with the mechanism actuating the respective throttle valves.

The primary throttle valve is provided with a fast idle which includes a fast idle cam 66 adapted to engage a screw 68 adjacent the end of an extension 70 of throttle lever 72 which is secured to one end of primary throttle shaft 56. The cam 66 is operably connected with a lever 74 fixed to one end of choke shaft 40 by a link 76 and the fast idle mechanism operates in the usual manner. It should be noted that the secondary or auxiliary induction passage has no fast idle mechanism in connection therewith and that the requirements of some engines are such that the economizer system and/or the acceleration pump may be dispensed with in connection with the secondary induction passage.

Generally the mechanisms for actuating the economizer valves are so arranged and operated that said valves are opened simultaneously. However, should only the primary passage be provided with an economizer system, it is desirable to have the secondary passage deliver a power mixture and to have the valve for said secondary passage open at substantially the same time that the economizer valve is opened although any other desired arrangement may be adopted.

Throttle shafts 56 and 58 are axially in the same vertical plane but shaft 58 is in a different horizontal plane than shaft 56. This construction is simple and relatively inexpensive to manufacture. The primary throttle valve 52 is actuated by the usual accelerator pedal (not shown), through a rod 78 connected with throttle lever 72 and throttle valve 54 is controlled by a suction responsive diaphragm mechanism or control unit which may be of any well known type and will therefore be but briefly described. It comprises shell or casing members 80 and 82 having a flexible diaphragm 84 clamped therebetween. A rod 86 is secured to the diaphragm and extends outwardly through an opening 88 in casing member 82. The outer end of rod 86 is connected to one arm of a bell crank 90 which is pivoted at 92, the other arm of the crank 90 being connected to a throttle lever 94 by means of a link 96, said lever 94 being secured to the auxiliary throttle shaft 58. A spring 98, reacting between the end wall of casing member 80 and a plate 100 secured to the diaphragm, urges the diaphragm in a direction which effects closing of the valve 54. Casing member 80 is closed by diaphragm 84 and the interior of member 80 forms a vacuum chamber 102 having a branched conduit 104 connected therewith, branch 106 of said conduit being connected with the small venturi 34 of the secondary induction passage by means of a vacuum tube 35 communicating with said venturi. The end of tube 35 may be undercut, as shown in Figure 2, to increase the suction on the tube; or formed as shown in Figure 7 to be subjected to air impact to decrease the effective suction on the tube; or formed with its face substantially parallel to the axis of the venturi. Although the tube 35 is shown projecting into the venturi, it is obvious that it could terminate flush with the venturi wall. Branch conduit 108 is connected with the primary throttle barrel 24 anterior to the throttle valve 52, when closed, by means of ports 110 spaced apart longitudinally of the primary induction passage. While two ports are shown in Figures 2 and 3, it is to be understood that more than two or only one may be used according to the effect desired. Other alternative port structures may comprise: an elongated slot extending in any suitable or desired direction, a combination of the slot and circular or other shaped ports, or a suitable vacuum tube similar to tube 35.

The spring 98 is calibrated to yield to suction on the diaphragm 84 above some predetermined degree, said diaphragm being actuated by the pressure differential on opposite sides thereof. The characteristics of the spring 98 are determined by the requirements of the particular engine to which the invention is attached.

The operation of the above described structure is as follows:

When the engine is idling the secondary throttle valve 54 is closed by the action of spring 98 and the primary throttle valve 52 is in its usual idling position whereat it is substantially closed. Such slight reduction of pressure below atmosphere in the primary induction passage anterior to the throttle valve thereof and which would be transmitted to chamber 102 of the diaphragm unit, is nullified by air bled to the vacuum system of said unit through conduit 106. However, even though air were not thus bled to the vacuum system of the unit, there would not be such reduction of pressure in the primary induction passage anterior to the throttle valve thereof during engine idling as to overcome the resistance of spring 98.

As the primary throttle valve 52 is opened, it passes the port 110 nearest the closed valve 52 so that said port is in a region of low pressure but air is bled to the conduit 108 through the other port 110 and air is also bled to the vacuum system of the control unit through conduit 106, there being substantially no reduction of pressure in the secondary induction passage until the throttle valve 54 has opened. The location of the upper port 110 is preferably such that it will be passed and become posterior to the throttle valve 52 when said valve has been opened to a position whereat the engine will normally attain a speed at which it will operate the car at, for example, fifty miles an hour. Both ports 110 are then in regions of pressure substantially below atmosphere and the reduction of pressure in the primary induction passage is sufficient to overcome the effects of air bled by conduit 106 and the force of spring 98 so that throttle valve 54 is initially opened. Thereafter the airflow through the secondary induction passage will effect a reduction of pressure below atmosphere in the small venturi 34 which will tend to reduce bleeding of air to the vacuum system of the unit for controlling the secondary throttle valve 54. Increased opening of the primary throttle valve with a consequent normal increase of engine speed will effect further reduction of air pressure in chamber 102 to thereby further open the secondary throttle valve. The air flow through the secondary induction passage is thus further increased so that a further drop of fluid pressure occurs in the small venturi 34 with a resultant aid in effecting opening of the secondary throttle valve 54, the effect being cumulative as the opening of the throttle valves progress.

It will be obvious from the two immediately preceding paragraphs that the pressure in chamber 102 is determined by the resultant of pressures in the primary and secondary induction passages and specifically such pressures as are present in the regions with which the respective conduits 106 and 108 communicate in said passages and the differential of pressures on opposite sides of the diaphragm effect actuation of the secondary throttle valve. It will also be apparent that the primary throttle valve primarily controls the opening and closing of the secondary throttle valve.

When the engine is operating at low speed with a wide open throttle, it is desirable to cut out the secondary induction passage as the air velocity through one induction passage, for a given engine speed with wide open throttle, is much greater than it is through two passages, therefore, by cutting out the secondary induction passage under such conditions the air velocity in the primary passage will be great enough to pick up sufficient fuel for a mixture of combustible proportions at much lower engine speeds than would be possible with both induction passages open. Thus when the engine speed decreases from an increase in load, the suction in the induction passages drops due to reduced air flow therethrough, and when the suction has dropped to a value at which it is unable to overcome the force of spring 98 the secondary throttle valve is closed by said spring. Thereafter at low speed wide open throttle the engine is supplied with fuel mixture only by the primary induction passage.

Under certain conditions, as when starting the engine cold, it is desirable to positively lock the secondary throttle valve in its closed position and this may be effected by the mechanism disclosed and claimed in the copending application of Albert H. Winkler, St. M.–705, for Carburetors, Serial No. 393,692, filed May 16, 1941, issued Sept. 7, 1943, Patent No. 2,328,763.

Figure 4 discloses a slightly modified form of the invention shown in Figures 2 and 3 and hereinbefore described. It will be noted that a common air inlet 37 is provided for both induction passages and is controlled by a choke valve 39. The throttle shafts 56 and 58 are substantially coextensive and parallel to each other and the conduit 106 has an opening which communicates with the large venturi 32 of the secondary induction passage adjacent to the throat thereof instead of the small venturi as shown in Figures 2 and 3, while conduit 108 has a single port 111 opening into the primary induction passage anterior to the closed throttle valve 52 and controlled thereby. The location of port 111 will depend upon the requirements of the engine to which the device is attached. It may be located at substantially the same position as the upper port 110 of the embodiment shown in Figures 2 and 3 in which arrangement it will not be exposed to the greatest suction until passed by valve 52.

The mechanism between the rod 86 of the control unit and the secondary throttle valve 54 also is somewhat different from that shown in Figures 2 and 3. In Figure 4, the rod 86 is pivotally connected with a link 120 which is also connected to one end of a lever 122 pivoted at 124 and having a slot adjacent the other end thereof, said slot 126 receiving a pin 128 fixed in secondary throttle lever 94. The operation of the device shown in Figure 4 is substantially the same as that shown in Figures 2 and 3, except as it is modified by the changes hereinabove described.

Figure 6:
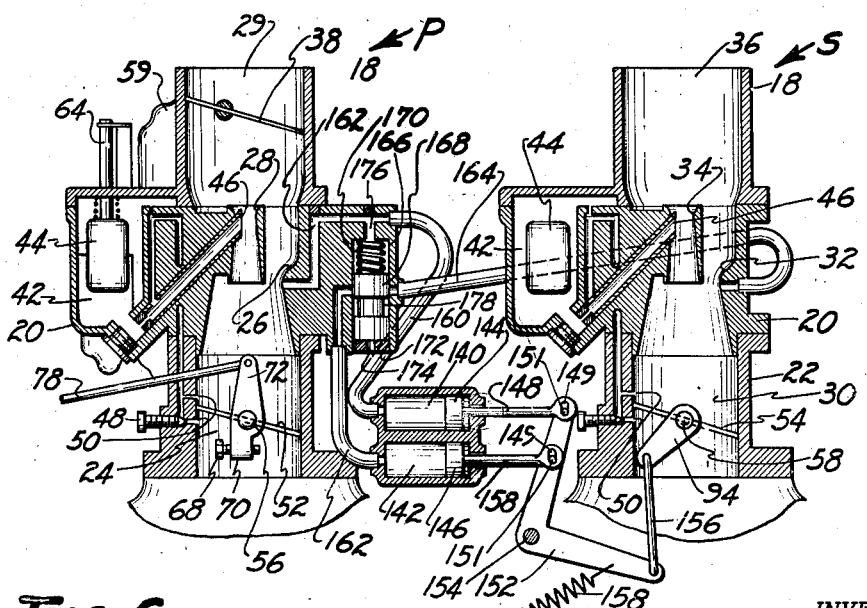
Figure 6 is a vertical section through still another embodiment thereof.
Figure 5:
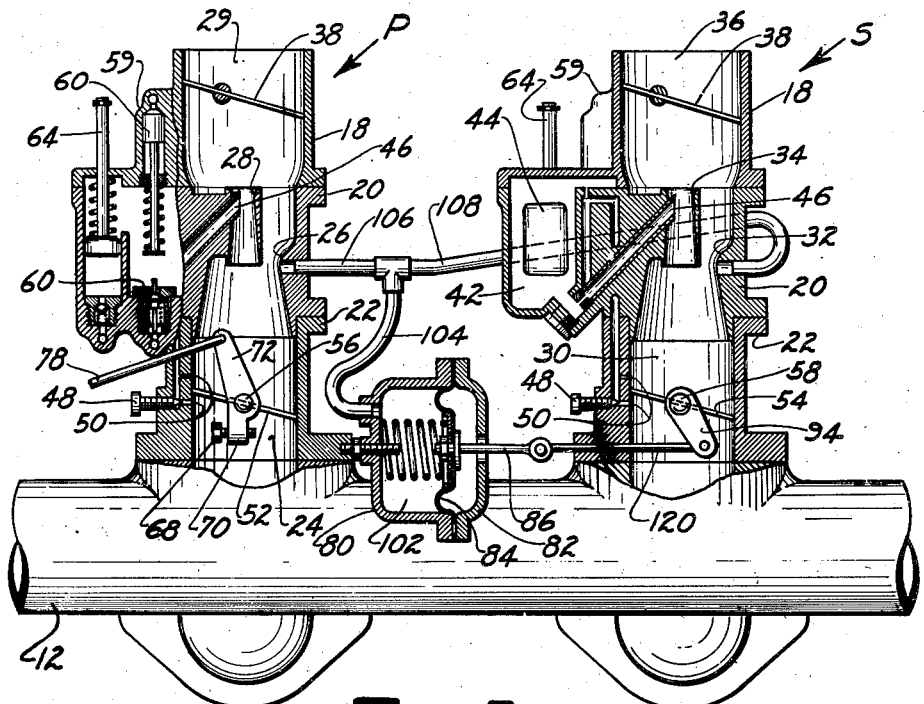
Figure 5 is a vertical section through another embodiment of the device.

In Figures 1, 5 and 6, the invention is shown incorporated in two separate carburetors.

Broadly the invention shown in Figure 1 is the same as that of Figures 2 and 3, the conduit connections of the control unit for the secondary throttle valve being connected with the respective induction passages in the same manner as the device shown in Figures 2 and 3 and both carburetors being provided with a simple idle system, acceleration pump, and economizer system all of which are of well known construction and operation. However, certain of these parts may be used or not as desired. In addition, the primary carburetor has a fast idle mechanism and both carburetors have their own float chamber. However, rod 120 is connected directly to the throttle lever 94.

The modification shown in Figure 5 is particularly characterized by the connection of the conduits 108 and 106 to the large venturi in the primary and secondary induction passages respectively, the connections being adjacent the greatest restriction of said venturis. Thus the pressure in chamber 102 is determined by the resultant of pressures in the respective induction passages and particularly the pressures within the large venturis adjacent the throats thereof.

The operation of this embodiment of the invention is similar to that shown in Figures 2 and 3, except that the primary throttle valve 52 does not control the port of conduit 108 opening into the primary induction passage. As the air flow in the primary induction passage increases with opening of the throttle valve 52 and increased engine speed, the pressure in said induction passage drops. After said pressure has dropped to a predetermined value sufficient vacuum is established in chamber 102, in excess of air bled through conduit 106, so that atmospheric pressure on the atmospheric side of the diaphragm will partially overcome the pressure of spring 98 thereby initially opening the secondary throttle valve 54. Thereafter, upon further opening of the primary throttle valve under normal operating conditions, and for low speed wide open throttle operation of the engine the device functions in substantially the same manner as hereinbefore described with reference to the embodiment shown in Figures 2 and 3. Each carburetor is provided with an unbalanced choke valve actuated in any suitable manner although with some engines the choke valve of the secondary carburetor may be dispensed with.

Another modification of the invention is shown in Figure 6, wherein the mechanism for controlling the throttle valve of the secondary carburetor includes a pair of cylinders 140 and 142, respectively, having pistons 144 and 146 therein. The pistons are provided with piston rods 148 and 150, respectively, having slots 149 adjacent their free ends and in which are received respective pins 151 of an arm of a bell crank 152. The bell crank 152 is pivoted at 154 and has its other arm connected with throttle lever 94 by a link 156. A spring, shown diagrammatically at 158, is attached at one end to some adjacent fixed member, not shown, and its other end is connected to an arm of the bell crank 152 and is adapted to yieldingly urge the secondary throttle valve 54 to closed position.

Cylinder 140 has a conduit 160 connected with a duct 162 communicating with the throat of the large venturi of the primary induction passage and the cylinder 142 has a connection with the throat of the large venturi in the secondary induction passage by means of conduits 162 and 164.

Means for controlling the connection between cylinder 142 and venturi 32 includes a cylinder 166 within which is a piston 168 yieldingly urged in one direction by a spring 170 reacting between one end wall of the cylinder 166 and the adjacent end of piston 168. A wall 172 limits the spring urged movement of piston 168 and an opening 174 in wall 172 relieves any undesirable pressures in the lower end of said cylinder 166. The end of cylinder 166 in which spring 170 is located communicates with duct 162 by means of passage 176 and piston 168 is adapted to normally close the ports of conduits 162 and 164 which open into the cylinder 166.

The operation of the structure shown in Figure 6 is as follows:

When the engine is idling the pressure in the primary induction passage is reduced but slightly below atmosphere and is insufficient to actuate either piston 144 or 168. However, when the primary throttle valve 52 has been opened sufficiently so that the engine will operate the automobile at fifty miles per hour, or at any other desired predetermined speed, under normal operating conditions, the air flow through the primary induction passage reduces the pressure in the venturi 26 below atmosphere sufficiently to actuate piston 144 against the force of spring 158, the characteristics of said spring 158 determining the degree of suction necessary to actuate piston 144. Spring 170 is so calibrated that the suction which will actuate piston 144 will also actuate piston 168 and raise same so that annular groove 178 of piston 168 permits fluid communication between conduits 162 and 164. Air flow through the secondary induction passage effects a reduction of pressure therein below atmosphere. As the groove 178 of piston 168 is in register with the openings into the cylinder 166 of conduits 162 and 164, a reduction of pressure is effected in cylinder 142 corresponding to that in the secondary induction passage. Piston 146 is thereby actuated and aids in opening the secondary throttle valve 54. Further opening of the primary valve 52, with a corresponding normal increase of engine speed, effects a further drop of pressure in the primary induction passage and a further opening of the secondary throttle valve, aided increasingly by increased suction in the secondary passage as the valve 54 is opened further and air flow in said secondary passage increases.

With a substantially wide open throttle and reduced engine speed the air flow through the induction passages decreases and the pressure therein rises. Under a heavy load the engine speed may drop to such an extent that the air flow through the induction passages will not be great enough to provide sufficient suction to overcome springs 158 and 170. The piston 168 will, therefore, be moved to a position whereat communication between conduits 162 and 164 is cut off and spring 158 will close the secondary throttle valve 54. All the air for the fuel mixture will pass through the primary induction passage and its velocity will be great enough to pick up the necessary quantity of fuel for a mixture of combustible proportions at very low engine speeds. However, the features and functions of the embodiment shown in Figure 6 may also be carried out with other mechanism without departing from the inventive concept thereof.

It should be noted that under low speed wide open throttle conditions the respective means of the various embodiments of the invention which control the throttle valve of the secondary induction passage include means for closing said valve and it is not necessary to provide a separate air flow valve or the like in said secondary induction passage to cut off the fluid flow therethrough.

While certain modifications and adaptations of the invention have been shown and described, it is to be understood that one or more of the various features of one modification or adaptation may be substituted for corresponding features of another modification or adaptation, or may be added thereto, and other variations in construction and operation may be incorporated into the invention without departing from the spirit and scope of the invention.

For example, in Figures 2 and 3, the conduit 106 may be connected with the large venturi adjacent its throat or said conduit may be connected to either venturi of the secondary induction passage at some other part than the throat thereof or may be connected with the induction passage at some other suitable location other than either of the venturis so long as it is anterior to the secondary throttle valve and is exposed to a region wherein pressure within the secondary induction passage will be varied by air flow in said passage. The connection of conduit 106 in other modifications of the invention may also be with any similarly suitable part of the secondary induction passage anterior to the secondary throttle valve or with the venturis thereof.

Similarly the conduit 108 may be connected with any suitable part of the primary induction passage anterior to the closed primary throttle valve or with any suitable part of either large or small venturi. It is to be also understood that either conduit may terminate in the induction passage in a simple port or ports, a vacuum tube or an impact tube such as shown at 71 in Figure 7, and which reduces the suction in the conduit relative to the suction in the induction passage in the region of the entrance of said tube.

The embodiment shown in Figure 5 may also be varied. Either conduit 108 or 106 may be connected with either large or small venturi of the respective primary and secondary induction passages or some other suitable part of said induction passages.

The arrangement of the throttle shafts in the various modifications may be arranged in various ways and the linkage between the control unit and secondary throttle valve may be varied to suit various conditions, and the control mechanism for the secondary induction passage may, in any one of the embodiments or adaptations, be a diaphragm mechanism, cylinder and piston arrangement, a syphon or the like. Further, a choke valve may be provided in the secondary induction passage or not according to the requirements of the engine with which the invention is used.

We claim:

1. In a multiple stage carburetor system having a pair of induction passages, a venturi in each of said induction passages and a pair of throttle valves, one in each of said passages, manual means for controlling the throttle valve of one of said induction passages, and means connected with the other throttle valve and responsive to the resultant of pressure within the venturis for controlling the last mentioned throttle valve.

2. In a multiple stage carburetor system including a primary carburetor and a secondary carburetor, each of which includes an induction passage with a large and a small venturi and a throttle valve, means for manually controlling the throttle valve of the primary carburetor, and means connected to and controlling the throttle valve of the secondary carburetor, the last mentioned means being responsive to the resultant of pressures within the large venturis.

3. In a multiple stage carburetor system, a primary and a secondary induction passage, a throttle valve in each of said passages, manual means for controlling the primary throttle valve, and automatic means for controlling the secondary throttle valve, said automatic means including a pair of suction responsive members, means connecting said members with the secondary throttle valve, means for subjecting one of said members to suction in the primary induction passage anterior to the throttle valve thereof, and means for subjecting the other member to suction in the secondary induction passage anterior to the throttle valve thereof.

4. The device defined in claim 3 and including a valve responsive to suction in the primary induction passage and controlling the means for subjecting said other member to suction in the secondary induction passage.

5. In a multiple stage carburetor system having a primary and secondary induction passage, a venturi in each of said passages, a throttle valve for each passage, manual means for controlling the primary throttle valve and automatic means for controlling the secondary throttle valve comprising a suction actuated device, means operatively connecting said device with the secondary throttle valve, and conduits connecting said device with both induction passages, the conduit to the primary induction passage terminating at a point adjacent the edge of the throttle valve when said valve is substantially closed, said point being adapted to be passed by the edge of said throttle valve as the latter is opened and the conduit to the secondary induction passage communicating with the venturi thereof.

6. In a multiple stage carburetor system having a primary and a secondary induction passage, a large and a small venturi in each induction passage, a throttle valve in each passage, means for manually controlling the primary throttle valve, and automatic means for controlling the secondary throttle valve comprising a suction actuated device, means operably connecting said device with the secondary throttle valve, and conduits connecting said device with both induction passages for transmitting suction to said device, the conduit to the primary induction passage terminating therein in a port adjacent the edge of the throttle valve when said valve is in a substantially closed position, and the conduit to the secondary induction passage communicating with the interior of the small venturi thereof.

7. In a multiple stage carburetor system including a pair of induction passages having venturis therein and a throttle valve in each passage: means for manually controlling one throttle valve; and automatic means for controlling the other throttle valve; said automatic means including a suction responsive device connected to said other throttle valve and pressure transmitting means operably connecting the device to the respective induction passages, at least one of said pressure transmitting means being connected with a venturi.

8. In a multiple stage carburetor system for an internal combustion engine: a pair of induction passages discharging into a single intake manifold; a pair of throttle valves, one in each of said passages; manual means for controlling the throttle valve of one of the induction passages; and means for automatically controlling the throttle valve of the other induction passage.

said automatic means including means connected with the throttle valve of the other passage and responsive to the suction in both said induction passages anterior to the throttle valves thereof.

9. In a multiple stage carburetor system for internal combustion engines: a pair of induction passages arranged in parallel; a throttle valve in each passage; means for manually controlling one of the throttle valves; suction responsive means connected to and controlling the other throttle valve; conduits connecting the suction responsive means with both induction passages; and means associated with one of the conduits adapted to modify the suction in said conduit relative to the suction in the induction passage with which it is connected.

10. The invention defined in claim 9, wherein the suction modifying means is adapted to increase the suction in the conduit relative to the suction in the induction passage with which said conduit is connected.

11. In a multiple stage carburetor system having a primary and a secondary induction passage arranged in parallel: a pair of throttle valves, one for each passage; means for manually controlling the primary throttle valve; and automatic means for controlling the secondary throttle valve comprising a presure actuated device; and pressure transmitting means connecting said device with both induction passages, the pressure transmitting means connecting said device with the primary induction passage terminating therein in a port adjacent the throttle valve thereof.

12. The invention defined in claim 11, wherein the pressure transmitting means connecting said device with the secondary induction passage communicates therewith anterior to the throttle valve thereof throughout its range of movement, and the port of the pressure transmitting means connecting said device with the primary induction passage is positioned anterior to the edge of the primary throttle valve when said valve is in a substantially closed position, said port being passed by the edge of the throtle valve when said valve is opened.

13. In a multiple stage integral carburetor including a pair of induction passages and a throttle valve for each passage: means for manually controlling the primary throttle valve; and automatic means for controlling the secondary throttle valve, said automatic means including a suction responsive device, and conduits connecting said device with both induction passages, the conduit to the primary induction passage communicating therewith by means of a plurality of ports adjacent the throttle valve thereof, said ports being spaced apart longitudinally of the induction passage anterior to said throttle valve when the latter is in an idling position.

14. In a multiple stage carburetor system for internal combustion engines having a primary and a secondary induction passage: a substantially balanced throttle valve in each passage; means for manually controlling the primary throttle valve; and automatic means for controlling the secondary throttle valve, said automatic means including a suction responsive device connected with the secondary throttle valve, and suction transmitting means connected with the primary induction passage whereby suction in said passage is adapted to actuate said device, and suction transmitting means connecting said device with the secondary passage and adapted to bleed air to said device until the primary throttle valve has been opened a substantial predetermined amount whereat the suction in the primary passage is sufficient to effect initial opening of the secondary throttle valve, whereupon suction is transmitted to the suction responsive device by the second mentioned suction transmitting means to aid in further opening said secondary throttle valve.

15. The invention defined in claim 14 wherein the connections of the suction responsive device with the respective induction passages are anterior to the throttle valves of said passages when said valves are in closed position.

16. In a multiple stage carburetor system having a primary and a secondary induction passage: a manually controlled throttle valve in the primary passage; and an automatically controlled throttle valve in the secondary passage, the automatic control including a pressure responsive device connected to the secondary throttle valve; a conduit connecting said device with the primary induction passage whereby the device is controlled by pressure in said passage, and a conduit connecting said device with the secondary induction passage anterior to the throttle valve thereof, whereby the control of said device is modified by pressure in said secondary passage anterior to the secondary throttle valve.

17. The invention defined by claim 16 wherein at least the secondary induction passage is provided with a large venturi and the last mentioned conduit is connected with the said venturi.

18. The invention defined by claim 16 wherein the secondary induction passage is provided with a large and a small venturi and the last mentioned conduit is connected with the small venturi; and a suction tube is provided for the conduit adjacent its point of connection with the small venturi whereby the suction in said conduit is increased relative to that in the venturi.

19. In a multiple stage carburetor system having a primary and a secondary induction passage and a throttle valve in each passage: means for manually controlling the primary throttle valve; a pressure responsive device connected to the secondary throttle valve; a conduit connecting the pressure responsive device with the primary induction passage anterior to the throttle valve thereof whereby said device is controlled by pressure anterior to said valve, and a conduit connecting said device with the secondary induction passage whereby the control of said device by pressure in the primary passage is modified by pressure in said secondary passage.

20. In a multiple stage carburetor system having a primary and a secondary induction passage discharging into a single manifold and a separate throttle valve in each passage: means for manually controlling the primary throttle valve; and a suction responsive device connected to the secondary throttle valve for automatically controlling said secondary throttle valve; a conduit connecting said suction responsive device with the primary passage anterior to the throttle valve thereof when closed, and a conduit connecting said device with the secondary passage for modifying the suction in said device relative to that provided by the primary induction passage.

ALBERT H. WINKLER.
JOHN H. GORE.